of Florida, Tallahassee, Fla.

United States Patent [19]
Laitinen et al.

[11] 4,214,017
[45] Jul. 22, 1980

[54] PREPARATION OF PLATINUM-COATED SUBSTRATES

[75] Inventors: Herbert A. Laitinen; Joseph Rosenfarb, both of Gainesville, Fla.

[73] Assignee: Board of Regents, State of Florida, for the use and benefit of the University of Florida, Tallahassee, Fla.

[21] Appl. No.: 25,117

[22] Filed: Mar. 29, 1979

[51] Int. Cl.$^2$ .............................................. C23C 3/00
[52] U.S. Cl. .................................. 427/92; 427/125; 427/431; 106/1.21; 106/1.28
[58] Field of Search ............... 427/431, 125, 88, 92; 106/1.24, 1.28, 1.15, 1.21

[56] References Cited

U.S. PATENT DOCUMENTS

| | | | |
|---|---|---|---|
| 2,398,738 | 4/1946 | Gilbert | 427/352 |
| 3,342,628 | 9/1967 | Sinclair | 106/1.24 |
| 3,461,058 | 8/1969 | Haley et al. | 427/115 |

FOREIGN PATENT DOCUMENTS 49-43064  11/1974  Japan .................................... 427/431

OTHER PUBLICATIONS

Hodge, Protective Metallic Coatings from Molten Salts, Metal Finishing, vol. 52, pp. 819–823, Nov. 1947.

*Primary Examiner*—Ralph S. Kendall
*Attorney, Agent, or Firm*—Arthur G. Yeager

[57] ABSTRACT

A process for chemical deposition of a thin platinum coating on a substrate.

4 Claims, No Drawings

PREPARATION OF PLATINUM-COATED SUBSTRATES

BACKGROUND

This invention relates to the production of extremely thin coatings of platinum on certain types of substrate. The resulting material may be used for many of the purposes for which platinum is used, including heterogenous catalysts for gas phase and liquid phase reactions and electrodes for electrochemical processes. This invention contemplates producing a thin platinum coating on a substrate with the result that the coated material has similar electrochemical properties to those of bulk platinum.

There are many techniques for coating platinum or other metal onto a substrate and perhaps the most well known is that which has come to be identified as electroplating or electrodepostion. This technique involves passing an electric current between two electrodes immersed in an electrolyte containing the coating metal. The substrate forms one of the electrodes and the passage of current causes the coating metal to deposit onto the surface of the substrate. This technique is highly desirable for many applications, but in the preparation of extremely thin, nonporous coatings it has limitations, particularly when the surface of the substrate is irregular as distinguished from flat and smooth. Other techniques such as thermal decomposition, vapor deposition, etc. suffer from one or more disadvantages when thin coatings are to be produced.

The present invention involves a procedure which does not include the application of an electric current from an external source. These procedures are sometimes known as electroless procedures and some developments have been made in this area in the prior art. In U.S. Pat. No. 3,342,628 to Sinclair a platinum-iron alloy is coated onto a ferrous metal substrat by dipping the ferrous substrate into a molten bath of calcium, calcium cloride, and platinum, and holding the substrate in that bath for a time sufficient to produce a coating of a platinum-iron alloy on the surface of the substrate. There is no indication that this process can produce a thin coating of platinum alone, as opposed to a coating of a platinum-iron alloy, or that it can produce such a coating on any substrate other than a ferrous metal substrate. In U.S. Pat. No. 3,461,058 to Haley et al there is described an electroless deposition or an electrodeposition or relatively thick, non-porous coatings (0.03-1 mil) of platinum followed by heat treatment and mechanical working. Such coating have little relationship to the extremely thin coatings of the present invention. In U.S. Pat. No. 3,630,768 to Bianchi there is described a procedure for depositing platinum onto a base metal using amino compounds in a chemical deposition method. Various platinum compounds are employed but there is no use of a molten salt as in the present invention, and the product of this patent contains relatively large amounts of platinum in the coating. In U.S. Pat. No. 3,635,761 to Haag there is described the electroless deposition of platinum onto any of several types of substrates employing either thermal decomposition of organometallic compounds or the use of hydrogen gas or other reducing agents. This procedure does not employ a molten salt bath as is specified in the present invention.

It is the object of this invention to produce extremely thin coatings of platinum on a substrate by an electroless process. It is another object of this invention to produce a platinum-coated substrate which exhibits similar electrochemical properties to those of bulk platinum. It is still another object of this invention to provide a process of coating a substrate with a thin layer of platinum from a molten salt bath.

The novel features believed to be characteristic of this invention are set forth with particularity in the appended claims. The invention, itself, however, both as to its organization and method of operation, together with further objects and advantages thereof, may best be understood by reference to the following description.

DESCRIPTION OF THE PREFERRED EMBODIMENT

Platinum enters solution as Pt(II), or $PtCl_4=$, when it is made an anode in a molten chloride salt such as LiCl-KCl eutectic. The anodic process is quantitative, and platinum metal forms an electrochemically reversible electrode with its ions in such a salt. H. A. Laitinen and R. A. Oysteryoung, J. Electrochem. Soc., 102,598 (1955); H. A. Laitinen and C. H. Liu, J. Am. Chem. Soc., 80,1015 (1058). It is known that platinum may be coated onto almost any conductive substrate by electrolysis, but such a coating is dendritic or granular and not uniform. Also, because many metals form reversible couples with their ions in this solvent, it is to be expected that, in general, metals more electrochemically active than platinum will displace platinum and enter solution. No thin, uniform coating will result because of these factors.

It has been found that when a sheet of glass coated with a thin film of electrically conductive tin oxide is soaked in a solution of Pt(II) in LiCl-KCl at 450° C., and the salt is washed thoroughly from the surface, the resulting surface closely resembles platinum in its behavior as an anode in aqueous oxalic acid-perchloric acid solution.

Table 1

| Potentials vs Saturated Calomel Electrode (Volts) | | | |
|---|---|---|---|
| | Untreated Tin Oxide | Pt-Treated Tin Oxide | Platinum |
| Oxalic Acid (in 0.5 M $HClO_4$) | 1.4 | 0.8–0.9 | 0.7 |

It is believed that the deposition of platinum results from the transfer of electrons from the conduction bands to platinum ions at the surface to form platinum atoms. This process resembles the transfer of electrons from the conduction bands of a metal in a displacement reaction, except that no metal ions are transferred to the solution. Accordingly, the process continues only to a limited extent, until the surface platinum atoms and ions in solution reach equilibrium. For such a process to occur, it is necessary that the metal to be plated be noble enough so that the electron transfer reaction can spontaneously proceed. Furthermore, there must not be an energy barrier to the transfer process sufficient in magnitude to render the process impracticably slow. These conditions are met by a molten salt solution of platinum-(II), but not by an aqueous solution, because of the irreversible nature of the plating process. Finally, the substrate must be inert at the potentials involved, so that it does not undergo an oxidation. This requirement rules out metals more active than platinum, except for those protected by a passivating film that prevents the ions of the metals from entering solution. Among such metals are those known as "valve" metals, such as titanium, niobium, etc. Also, included are aluminum and certain alloys, such as stainless steel. Carbon and conductive tin oxide are examples of non-metallic materials with the necessary properties for use as substrates in the process of this invention.

To illustrate the preparation, the treatment of a sheet of glass coated with a conductive film of tin oxide is given as an example. The sheet is immersed in a bath of 0.01 molar Pt(II) in LiCl-KCl at 450° C. for twelve hours. The sheet is taken out of the melt, cooled, and washed with triply distilled water and dried. The amount of platinum on the surface was found to be 0.05 microgram/cm$^2$.

Graphite, glassy carbon and reticulated vitreous carbon were similarly treated and behaved in a similar manner.

Commercial uses of the invention include electrochemical applications, such as fuel cells; inert electrodes for chlorine production or other similar electrochemical processes; counter electrodes in application such as electrowinning and recovery of trace metals from plant effluents; and oxygen gas-sensing electrodes such as those used in the automobile industry for monitoring the fuel-air ratio by analysis of exhaust manifold gas. Another area of application includes the heterogeneous catalyst systems used in many types of gas and liquid phase chemical processes. A specific example of use is an automobile catalytic convertor where an extremely small amount of a platinum metal applied over a large surface area serves to convert noxious exhaust gases into environmentally acceptable materials.

While the invention has been described with respect to a certain specific embodiment, it will be appreciated that many modifications and changes may be made by those skilled in the art without departing form the spirit of the invention. It is intended, therefore, by the appended claims to cover all such modifications and changes as fall within the true spirit and scope of the invention.

What is claimed as new and what is desired to secure by Letters Patent of the United States is:

1. A process for coating a substrate with a thin layer of platinum which comprises immersing a substrate in a molten salt solution containing platinum ions or haloplatinum ions for a time sufficient to deposit a thin film of platinum on the outer surface of the substrate, removing the coated substrate from the solution, and washing away any removable salt, said substrate being an n-type semiconductor or a metal coated with a passivation film capable of preventing ions of said metal from entering said solution.

2. The process of claim 1 in which the substrate is antimony-doped tin oxide, non-stoichiometric titanium dioxide, graphite, or a metal covered by a thin protective oxide film that is impermeable to metal ions.

3. The process of claim 1 in which said molten salt solution is a solution of Pt (II) ions in LiCl-KCl at a temperature of 450° C.

4. The process of claim 2 in which said metal is titanium, niobium, aluminum, or stainless steel.

* * * * *